Jan. 24, 1950     C. R. McCAULEY     2,495,416
LIQUID LEVEL INDICATOR
Filed June 7, 1945     5 Sheets-Sheet 2

Inventor
Claudius R. McCauley

Jan. 24, 1950

C. R. McCAULEY 2,495,416

LIQUID LEVEL INDICATOR

Filed June 7, 1945

Inventor,
Claudius R. McCauley
By [signature]
attorney.

Jan. 24, 1950  C. R. McCAULEY  2,495,416
LIQUID LEVEL INDICATOR
Filed June 7, 1945  5 Sheets-Sheet 5

Fig. 10.

| GAGE FEET | | QUANTITY BARRELS | | |
|---|---|---|---|---|
| | 100 | 0 FEET TRIM | 4 FEET TRIM | 8 FEET TRIM |
| 7'-0" | ○ | 336 | 336 | 336 |
| 6'-9" | ○ | 324 | 333 | 334.5 |
| 101 6'-6" | ○ | 312 | 324 | 330 |
| 6'-3" | ○ | 300 | 312 | 322.5 |
| 6'-0" | ○ | 288 | 300 | 312 |
| 5'-9" | ○ | 276 | 288 | 300 |
| 5'-6" | ○ | 264 | 276 | 288 |
| 5'-3" | ○ | 252 | 264 | 276 |
| 5'-0" | ○ | 240 | 252 | 264 |
| 4'-9" | ○ | 228 | 240 | 252 — 102 |
| 4'-6" | ○ | 216 | 228 | 240 |
| 4'-3" | ○ | 204 | 216 | 228 |
| 4'-0" | ○ | 192 | 204 | 216 |
| 3'-9" | ○ | 180 | 192 | 204 — 102 |
| 3'-6" | ○ | 168 | 180 | 192 |
| 3'-3" | ○ | 156 | 168 | 180 |
| 3'-0" | ○ | 144 | 156 | 168 |
| 2'-9" | ○ | 132 | 144 | 156 |
| 2'-6" | ○ | 120 | 132 | 144 |
| 2'-3" | ○ | 108 | 120 | 132 |
| 2'-0" | ○ | 96 | 108 | 120 |
| 1'-9" | ○ | 84 | 96 | 108 |
| 1'-6" | ● | 72 | 84 | 96 |
| 1'-3" | 100 | 60 | 72 | 84 |
| 1'-0" | ● | 48 | 60 | 72 |
| 0'-9" | ○ | 36 | 48 | 60 |
| 0'-6" | ○ | 24 | 36 | 48 |
| 0'-3" | ○ | 12 | 24 | 36 |
| 0'-0" | ○ | 0 | 12 | 24 |

Inventor
Claudius R. McCauley
By J. Imirie
Attorney

Patented Jan. 24, 1950

2,495,416

UNITED STATES PATENT OFFICE 2,495,416

LIQUID LEVEL INDICATOR

Claudius R. McCauley, New Orleans, La.

Application June 7, 1945, Serial No. 598,079

5 Claims. (Cl. 177—351)

This invention is directed to an improvement in liquid level indicators designed particularly for the tanks on ships, but in nowise restricted to such use.

The primary object of the invention is the provision of a liquid level indicator, which, aside from the float member, is completely electrical in character, in utilizing electrically energized signals as lights as the indicating elements with particular arrangement of such signals and their energizing contacts as controlled by the float movement to simplify and minimize the circuiting arrangement to avoid over-multiplicity of cable wires and limit necessity of multiple connections to be made on installation and promote simplicity of correction, replacement and repair, when necessary.

A further object of the invention is the provision of a desired number of signals arranged in groups with a correspondingly positioned signal of each group having a common energizing conductor, with automatically controlled means governed by the float operation to inaugurate the energization of the signals of the one group containing the signal designed to indicate the level mark while at the same time interrupting the signals of all of the other groups.

A further object of the invention is the provision of a commutator in which the contact segments are spaced in direct relation to the width of the float responsive brush.

A further object of the invention is the provision of control elements including a fixed commutator having signal controlling segments arranged in groups with similar common conductors to that of the signals and a brush element selectively cooperating with the commutator segments under the action of the float, together with the provision of commutator strips for selective contact in the movement of the brush and in circuit to control switches for selecting a particular signalling circuit group for energization under a particular brush position with the result that circuiting conditions from the commutator segment will connect a similar signal of each group for energization, while the particular commutator strip will place in an energizing circuit only one group of signals with the result that a single signal is actually energized.

A further object of the invention is the provision of an auxiliary signal between each group of signals and an auxiliary commutator segment between each group of segments, together with an effective length relation between the brush and adjacent commutator segments in order that in the movement of the brush an auxiliary signal will be energized during the time necessary to operate switch actuating means in the selection of the group of signals to be consecutively energized in the movement of the brush, to thus avoid any break in the sequence of the signals being energized.

The invention is illustrated in the accompanying drawings in which:

Figure 3 is an enlarged broken vertical section of a commutator and brush.

Figure 10 is a view in elevation of an indicating chart cooperating with the respective panel board signals and marked to give correct readings with the respective signals for relatively varying amounts of trim of the ship in which the tank being measured is carried.

Figure 1:
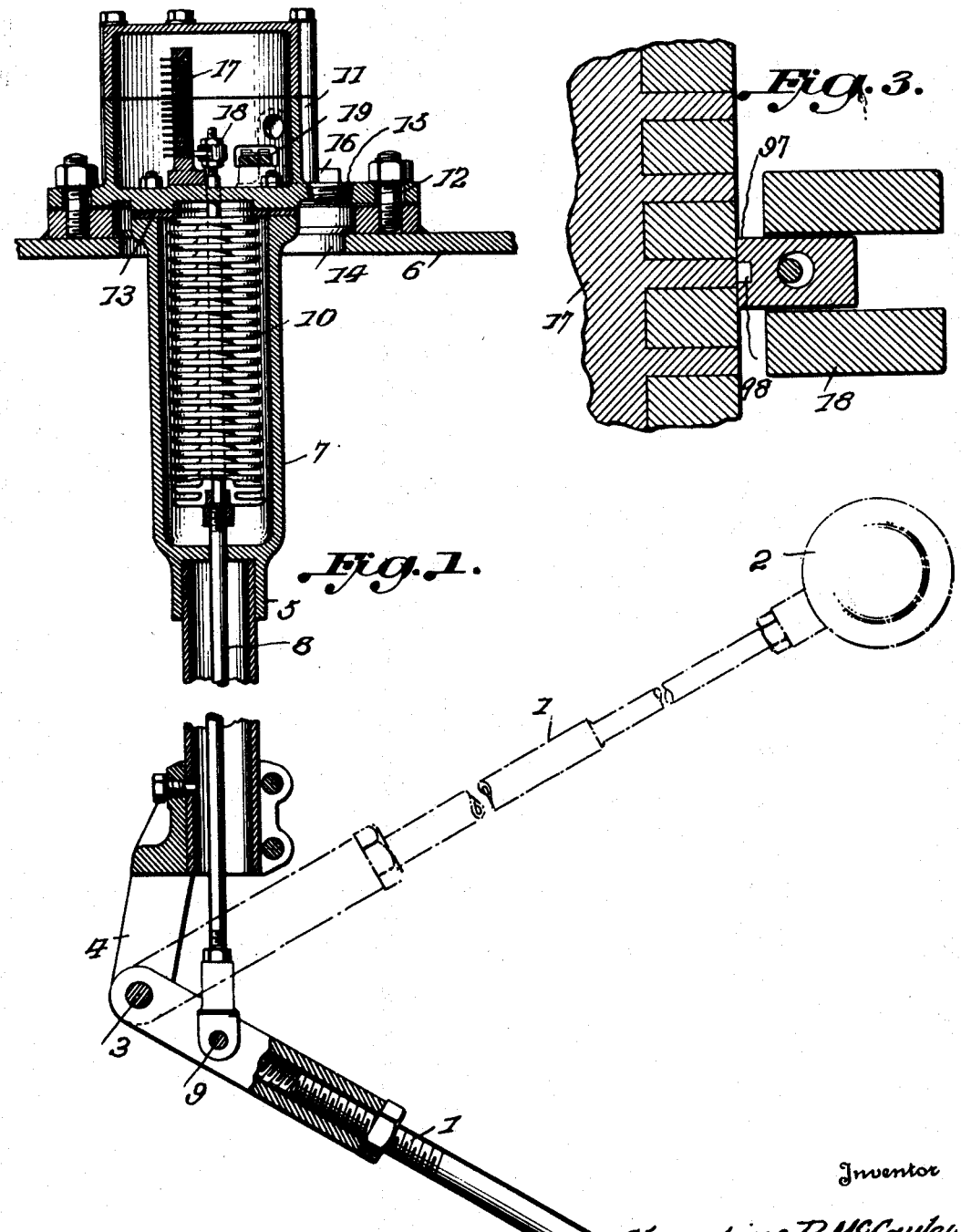
Figure 1 is a view partly in section illustrating the float mechanism, including the commutator and brush, but omitting any circuiting wires.
Figure 2:
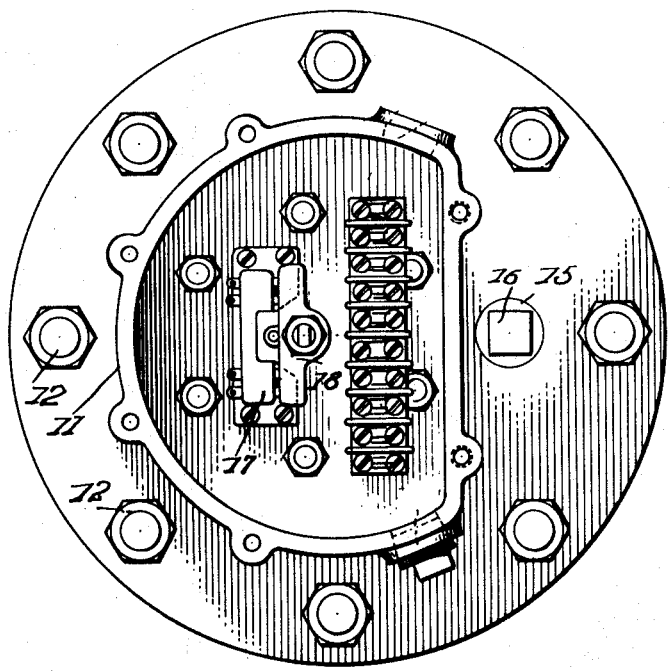
Figure 2 is a plan view of the commutator casing, the casing proper being shown with the top removed.
Figure 4:
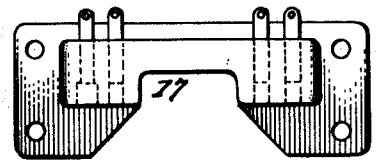
Figure 4 is a plan of the commutator.
Figure 5:
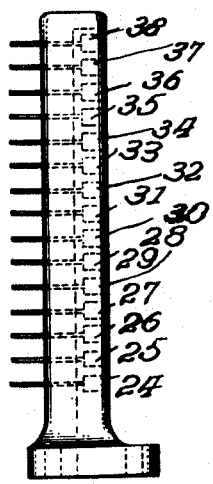
Figure 5 is a side elevation of the commutator.
Figure 6:
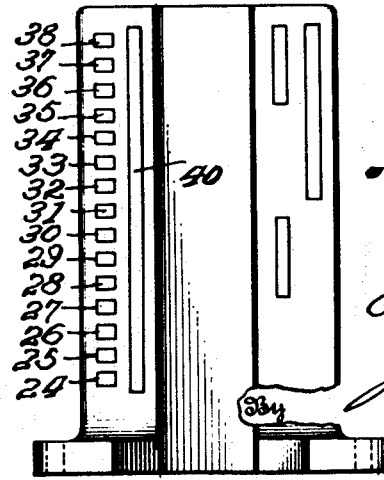
Figure 6 is front or face view of the commutator.

The float mechanism per se includes a float arm 1, preferably adjustable in length as indicated, carrying at one end a float 2 and pivotally connected at the opposite end at 3 to a bracket 4 depending from a housing 5 which extends upward and through the tank 6. The housing 5 includes in its upward portion a chamber 7 through which and through the skeleton part of the housing 5 extends a rod 8, connected at 9 to the float arm 1 and extending through and above the chamber 7, within which chamber 7 is arranged a bellows 10.

Overlying and in line with the housing 5 is a commutator casing 11 removably secured at 12 to the upper surface of the tank and bearing directly upon the upper end of the housing 5, with intermediate sealing gaskets 13. The housing 5 is spaced from the opening in the tank through which it passes to provide an air outlet 14 and the base of the casing 11 is formed with an outlet 15 controlled at will by a plug 16 in line with the air outlet. Secured in the casing 11 is a commutator 17 to be more particularly described hereinafter, and the upper end of the rod 8 extends into the casing 11 and is provided with a brush 18, also specifically described later. A terminal block 19 for all wires leading into the casing is also preferably provided.

The bellows 10 provides an airtight seal between the tank and the commutator casing 11, as will be evident, and tends to provide an explosion-proof disposition of the parts, for should the bellows become punctured or fractured, explosive gases may leak from the fuel tank into the commutator casing and if that explosion should occur, it will be confined to the commutator casing and will not travel into the chamber 7 because of the close tolerance of the rod 8 through the bottom of the casing 11. Any flaming gas escaping past this opening will be cooled down below the kindling temperature, largely in the same manner as in an explosion-proof motor. Thus, the commutator casing 11 is substantially explosion-proof.

For the purpose of the invention it is important to provide a large number of signals, hereinafter referred to as lights, to be energized through a relatively few number of wires and yet have such lights energized as contact is made with its particular corresponding commutator segment. To secure this result, the lights and commutator segments are arranged in groups.

Figure 7:
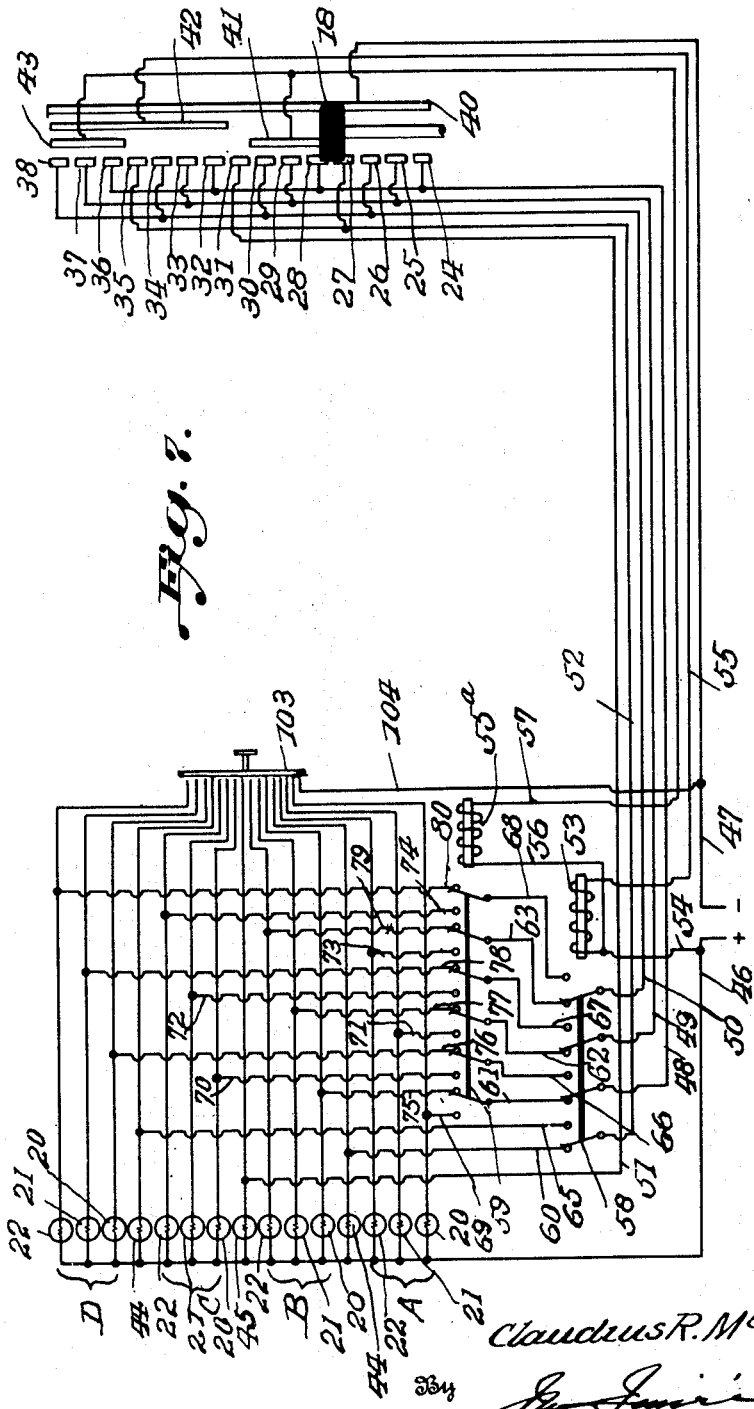
Figure 7 is a diagrammatic view showing the commutator segment and signal between each group for energization during operation of the switching means, and a testing means for determining the functionability of the signals.

With particular reference to Figure 7, it will be noted that the lamps are arranged in groups, indicated at A, B, C, and D, with each group including three lamps 20, 21, and 22. The commutator 17 has a number of segments corresponding to the number of lights indicated, the segments being indicated at 24, 25, 26, 28, 29, 30, 32, 33, 34, 36, 37, and 38.

The commutator, in addition to the commutator segments includes a contact strip 40 paralleling and coextensive with the commutator segments, and additional relatively different lengths of contact strips 41, 42, 43, arranged in a predetermined order to the contact segments as will later appear. The brush 18 and the commutator segments and contact strips are so arranged that in operation the brush will electrically engage a contact segment or segments and any contact strip aligned therewith transversely of the commutator to insure continuity of circuits in the proper control of the signals.

As the brush 18 will, in operation, move over and contact the commutator segments, it will electrically engage two adjacent commutator segments simultaneously and it is therefore necessary to provide an independent commutator segment and a corresponding light or signal, each arranged between the respective groups of commutator segments and between the respective groups of signals or lights. This is necessary to provide means for operating the relays to switch from one group of lights to another group without any break in the sequence of the lights being lighted. If this independent segment and lights were not present only one light would be lighted when the brush made contact simultaneously with the last segment of one group and the first segment of the successive group, and the particular light which would be lighted would be dependent upon which way the relay was operated, therefore, there is provided a light 44 between groups A and B and groups C and D and a light 45 between groups B and C. The commutator segments include in proper sequence with the other segments already referred to, a commutator segment 27 between segments 26 and 28, a commutator segment 31 between segments 30 and 32, and a commutator segment 35 between segments 34 and 36.

The circuits for controlling the lights will now be described.

The positive lead 46 is in circuit with the same side of each of the signal lights and the negative lead 47 is directed to and in circuit with the contact strip 40. The three lamps in each group are fed by the same feeder wires 48, 49 and 50 which respectively electrically connect with the commutator segments corresponding to such lights, that is, the feeder wire 48 is electrically connected to the commutator segments 24, 28, 32, and 36; and feeder wire 49 is electrically connected to the commutator segments corresponding to the next series of signals, that is, the segments 25, 29, 33 and 37; while the feeder wire 50 is electrically connected to the commutator segments 26, 30, 34 and 38. Feeder wire 51 is connected to the lamp 45 and to the commutator segment 31; while the lamps 44 are fed by the conductor 52 terminating at one end in a switch point in the panel in which the light system is mounted and at the other end in an electrical connection with the commutator segments 27 and 35.

A relay 53 is in the panel board electrically connected by wire 54 with the lead 46 and by wire 55 with the conductor strip 42 of the commutator section. A second relay 55a is connected by wire 56 through wire 54 to the lead 46 and by wire 57 to the contact strips 41 and 43 of the commutator section.

A double throw switch 58 is controlled by the relay 53 while a second double throw switch 59 is controlled by the relay 55a. Switch 58 maintains constant engagement with the feeder wires 48, 49, 50 and 52 and in normal position connects with conductor 60 leading to the other side of light 44 between the series A and B; and with conductors 61, 62 and 63, respectively leading to fixed points of switch 59. The switch 58 when operated by the relay 53 engages conductor 65 which leads to the other side of light 44 between series C and D; and with conductors 66, 67 and 68, respectively leading to fixed points of switch 59. Switch 59 when in normal position, that is, not under the influence of relay 55a, engages a conductor 69 leading to the other side of light 20 of group A; conductor 70 leading to the other side of light 20 of group C; conductor 71 leading to the other side of light 21 of group A; conductor 72 leading to the other side of light 21 of group C; conductor 73 leading to the other side of light 22 of group A; and conductor 74 leading to the other side of light 22 of group C. Switch 59, when operated through energized relay 55a, as shown in Fig. 7, engages a conductor 75 leading to the other side of light 20 of group B; conductor 76 leading to the other side of light 20 of group D; conductor 77 leading to the other side of light 21 of group B; conductor 78 leading to the other side of light 21 of group D; conductor 79 leading to the other side of light 22 of group B; and conductor 80 leading to the other side of light 22 of group D.

A brief description of the operation of the system shown in Figure 7 will be given. It will be noted that when the brush 18 successively contacts with the commutator segments 24, 25 and 26 and simultaneously engages the contact strip 40, neither of the relays 53 or 55a are energized and the relay switches are in their normally deenergized position. As the feeders 48, 49 and 50 are connected directly to the lights 20, 21, 22 of the first group A, the described movement of the brush will energize these lights successively. As the brush moves on to commutator segment 27 to energize light 44 between groups A and B, it will, while still contacting contact strip 40, also contact contact strip 41. This energizes relay 55a moving the switch 59 into the position illustrated in Figure 7 and switching the feeders 48, 49 and 50 to the second group of lights B, which lights 20, 21 and 22 of group B will be energized in succession. As the brush engages commutator segment 28 it again energizes feeder 48 which now as the switch 59 has been shifted, energizes the light 20 of group B. Relay 55a remains energized while the brush is operating on the commutator segments 28, 29 and 30, the feeders 48, 49 and 50 respectively being connected to this group. As the brush moves into contact with segment 31 to energize light 45, it passes beyond the contact strip 41 and the relay 55 is de-energized so that switch 59 is permitted to return to normal. As the brush moves to segment 32, it engages the contact strip 42 and thereby energizes relay 53 which moves switch 58 to the alternate position. This action of switch 58 switches the feeders 48, 49 and 50 to the lights of group C and the lights of this group will be energized as the brush successively engages commutator segments 32, 33 and 34. It will be noted that none of the lights of the other groups will be energized as their circuits are open at the relay switches. As the brush moves into contact with commutator segment 35 the brush will also electrically contact contact strip 43 while remaining in contact with strip 42. Under these conditions, relay 55a is again energized and as both switches are now moved to the alternate position, the feeders 48, 49 and 50 will be connected to the lights of group D, and the respective lights 20, 21 and 22 of this group will be energized in the successive contact of the brush with these contact segments.

The circuits controlled by the contact segments 27, 31, and 35 will serve to energize the lights 44 between groups A and B, 45 between groups B and C; and 44 between groups C and D, during the time that the relays are switching the circuits from one group of lights to another. In this connection, it will be noted that commutator segments 27 and 35 are connected to the same wire leading to the upper and lower lights 44, and the particular light of these two lights to be energized is dependent upon whether the brush is in engagement with strip 42, that is, whether relay 53 is or is not energized.

A testing switch capable of closing all light circuits is provided at 103, connected by wire 104 to negative conductor 47—see Figure 7.

Figure 8:
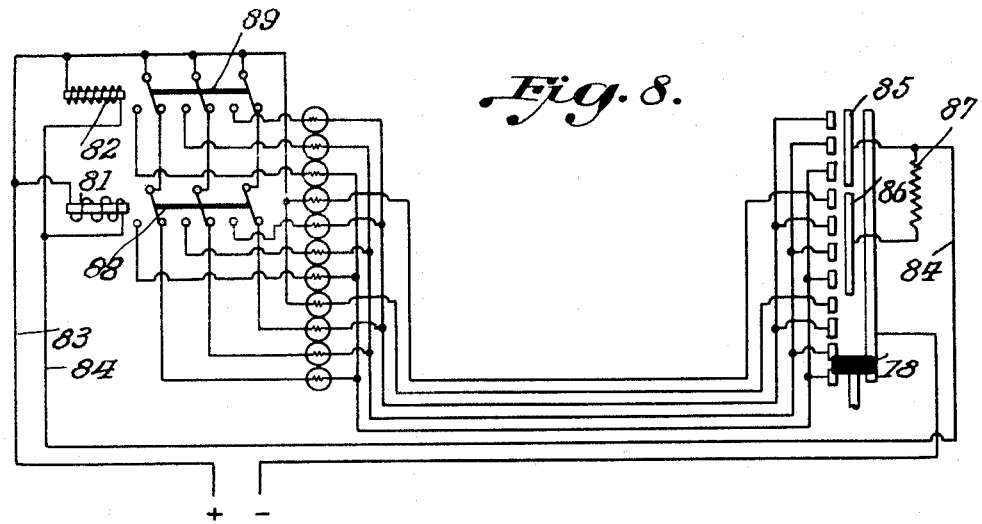
Figure 8 is a similar view showing the use of two relays controlled by a single wire operating three groups of signals.
Figure 9:
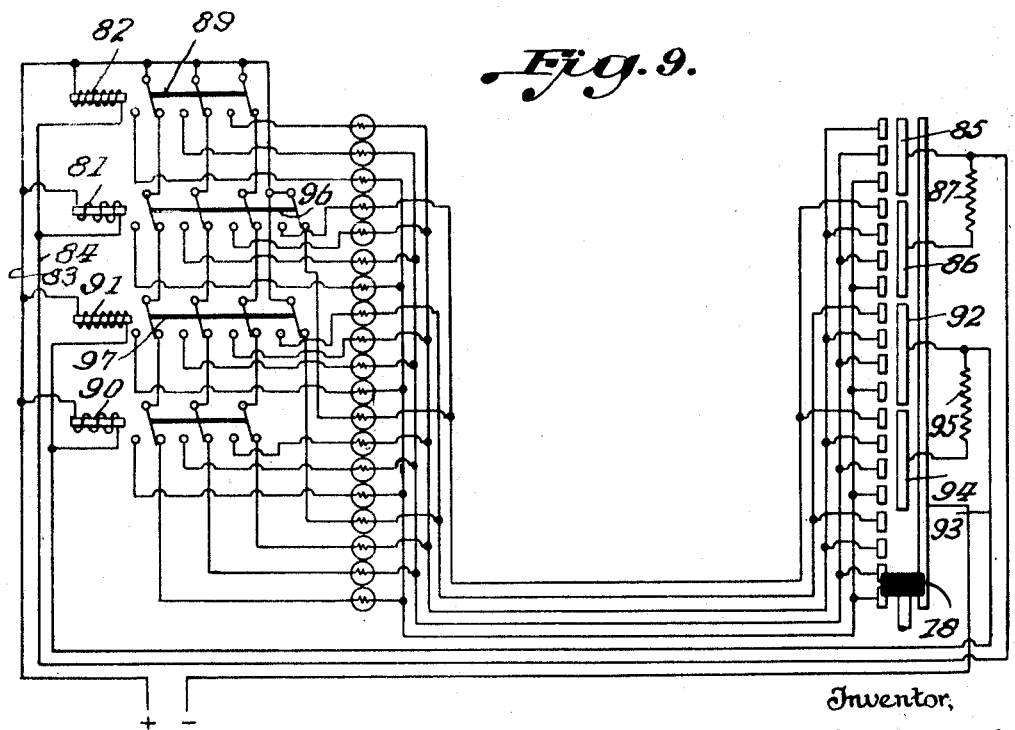
Figure 9 is a view similar to Figure 8 showing the use of a second pair of relays to add two more groups of lights.

In Figures 8 and 9, relays are added, controlling switches which each add a light to a connecting wire. As will be clear from Figures 8 and 9, two relays may be connected to the same wire but controlled by independent commutator segments. Thus, as in these Figures 8 and 9, relay 81 and commutator controlled wire main wire 83 and commutator controlled wire 84, the latter leading to upper and lower commutator contact strips 85 and 86. The connection of the contact strip 86 to the wire 84 is through a predetermined resistance 87, and the relay 81 has a low voltage winding while relay 82 has a high voltage winding. Thus, when the brush makes contact with the contact strip 86 the circuit is established through resistor 87 and of course, both relays 81 and 82. However, relay 81 having the low voltage winding is energized, shifting the switch 88 to direct the current from one group of lights to the next, relay 82 owing to its high voltage winding not being energized. When the brush engages contact strip 85, the resistance 87 is cut out of the circuit and relay 82 is energized. This operates switch 89 from the second to the third group of lights, relay 81 remaining in its alternate position.

In Figure 9 a second pair of relays 90 and 91 are provided to add two more groups of lights, which are connected for control by the commutator through contact strip 92 connected to wire 93 leading to the last pair of relays and connected to a second contact strip 94 through a resistance 95. Of course, the operation is the same as that described in connection with Figure 8 in the control of the relays in accordance with the movement of the brush.

In order to avoid additional wires for the additional separating lights, relays 81 and 91 are provided with double throw switches 96 and 97 in order that alternate separating lights can be fed by the same wire. Thus, in a system shown in Figure 9, the addition of two groups of lights to the system necessitates only the addition of one connecting wire for the second pair of relays. Obviously, the system may be enlarged to provide as many additional lights as are deemed necessary. The other details of the Figures 8 and 9 are in accordance with the above disclosure in Figure 7 and do not require to be repeated here.

The brush 18 has a contacting face 97 of such contact width that the distance moved by the brush during the time that contact is made on one segment of the commutator is equal to the distance moved by the brush during the time that contact is made on two segments. Thus the effective use of the number of commutator segments for level indication is practically doubled, being numerically equal to twice the number of commutator signals minus one. Thus, a commutator with fifteen segments will give twenty-nine distinct indications of level on the indicator lights. As the commutator moves up from the bottom, it lights the lower light, then the lower light and the next succeeding light, then such next succeeding light, then the next succeeding light and the following light, and so on throughout the number of lights. This provides a reading for each light and a second reading for each two adjacent lights. In order to provide equal intervals of the brush movement with respect to the indicator readings, the width of the contact surface of the brush must be equal to one-half the width of the commutator segment plus one and a half times the width of the space between commutator segments. This is clearly shown in Figure 3 of the drawings. In order to provide that the brush will make contact clear to the extreme side of its contact surface, the center part of such surface is cut away at 98 in the form of a groove to prevent the brush rocking on its center position.

The invention also includes an indicator chart which will give correct readings under various degrees of trim of the ship. This gauge is shown in Figure 10 with the signals indicated at 100, the gauge feet at 101, and quantity readings in agreement with the trim of the ship, indicated at 102.

The gauge mechanism is preferably located in the forward end of the tank as less obstruction usually exists at this end, thus facilitating the installation. However, it may be located at the opposite end of the tank and still provide effective reading.

It will be apparent from the above construction that an extremely accurate level gauge indicator is provided, in which the signals or lights and therefore the gauge readings may be of any number to afford narrower margin readings, with such lights operated by a commutator and brush and located on a remote panel board, with the electrical connection between the commutator at the tank and the signals on the remote panel board reduced to a degree to simplify the wiring conditions without sacrificing any signalling efficiency.

When any signal is lighted in line with the chart, the barrel quantity according to the trim is indicated in the figures extending laterally of the energized light. Where adjacent lights are energized as previously described in connection with Figure 7 and as illustrated in hatching in Figure 10, the reading is shown in the line extending laterally between the energized lights.

The invention is primarily directed to three important features:

First, the division of signals into equal groups with corresponding signals in each group fed by the same feeder, and means to switch the use of the feeders from one group to another, Second, the arrangement of a commutator and brush with such physical dimensions that one, then an adjacent pair of signals will be alternately engaged with equal space movement of the brush to indicate equal increments of level, and Third, a chart adjacent to the signals that gives the quantity within the tank corresponding to different trim conditions of the tank.

What is claimed as new is:

1. A telemetric system for indicating variations of a quantity or the like, comprising an indicator including a plurality of electric signals to be selectively energized to indicate changes in the quantity, means dividing the signals into selective groups with an intervening single signal between each group, means responsive to a change of range of the quantity for selecting a group of signals to be energized and including separate relay means connected to a common feeder and responsive to different voltages and means for controlling the voltages supplied to said common feeder, a feeder connected to corresponding lamps of each group, a separate feeder connected to each single lamp, and means responsive to a change of the quantity for selecting a feeder or pair of feeders to be energized to indicate the prevailing quantity.

2. A telemetric system for indicating variations of a quantity or the like, comprising an indicator including a plurality of electrically operated lamps to be energized to indicate changes in the quantity, means dividing the lamps into selective groups with an intervening single lamp between the groups, relay operated switching means for selecting a group of lamps to be energized and including means for selecting a single intervening lamp to be energized adjacent the selected group of lamps, means responsive to a change of range of the quantity for operating said relay operated switching means, a common feeder for each corresponding lamp of each group, a common feeder for each two alternate intervening single lamps and means responsive to a change of the quantity for selecting a feeder or pair of feeders to be energized to indicate the prevailing quantity.

3. The invention as defined in claim 2 wherein said last named means includes a selector switch means having a plurality of equally spaced and equal width bars and a brush means cooperating with said bars having a contact width equal to one half the width of a bar plus one and one half times the width of the space between adjacent bars.

4. A telemetric system for indicating variations of a quantity or the like, comprising an indicator including a plurality of electric lamps divided into selectable groups with a selectable single lamp between each group, selector means for selecting a group of lamps to be energized, selector means for selecting a single lamp of the selected group to be energized, relay means for actuating both said selector means and responsive to different voltages on a common feeder, means responsive to a change of range of the quantity for controlling the voltage on the common feeder, and means responsive to a change of the quantity for selecting from the selected group of lamps and adjacent single lamp, a single lamp or a pair of adjacent lamps to be energized to indicate the prevailing quantity.

5. The invention as defined in claim 4 wherein the last said means includes a common feeder for corresponding lamps of each group, a common feeder for alternate single lamps, commutator means having bars grouped identical to the grouping of the lamps with corresponding bars of each group connected to the feeder for the corresponding lamp of each group and corresponding alternate intervening bars connected to the feeder for corresponding alternate single lamps and brush means cooperating with said commutator means having a contact width equal to one half the width of the commutator bar plus one and one half times the width of the space between adjacent bars.

CLAUDIUS R. McCAULEY.

REFERENCES CITED

The following references are of record in the file of this patent:

UNITED STATES PATENTS

| Number | Name | Date |
|---|---|---|
| 532,868 | Bull | Jan. 22, 1895 |
| 823,164 | Eble | June 12, 1906 |
| 1,340,145 | Blair | May 18, 1920 |
| 1,366,832 | Pierce | Jan. 25, 1921 |
| 1,458,338 | Grimshaw | June 12, 1923 |
| 1,691,360 | Reagan | Nov. 13, 1928 |
| 1,774,025 | Maher | Aug. 26, 1930 |
| 2,098,085 | D'Arcey | Nov. 2, 1937 |
| 2,329,412 | Nelson | Sept. 14, 1943 |
| 2,410,821 | Hillman | Nov. 12, 1946 |

FOREIGN PATENTS

| Number | Country | Date |
|---|---|---|
| 287,274 | Germany | Sept. 18, 1915 |